United States Patent [19]
Lee

[11] Patent Number: 6,012,963
[45] Date of Patent: Jan. 11, 2000

[54] SCENTED DOLL ASSEMBLY

[76] Inventor: Lena M. Lee, 431 W. Gay St. #E, West Chester, Pa. 19382

[21] Appl. No.: 09/146,493

[22] Filed: Sep. 3, 1998

[51] Int. Cl.[7] .............................. A63H 3/36; A63H 3/00; B29B 7/00
[52] U.S. Cl. .................... 446/385; 496/268; 264/328.18; 264/349; 428/905
[58] Field of Search ..................................... 446/268, 385, 446/384, 391, 394; 264/328.18, 21, 349, 211; 532/102; 428/905; 425/DIG. 55

[56] References Cited

U.S. PATENT DOCUMENTS

| | | | |
|---|---|---|---|
| 2,618,892 | 11/1952 | Locks et al. | 446/268 |
| 3,310,907 | 3/1967 | Robbins | 446/385 X |
| 3,500,578 | 3/1970 | Albert | 446/394 |
| 4,471,565 | 9/1984 | Terzian et al. | 446/384 X |
| 4,476,171 | 10/1984 | Takeuchi | 428/905 X |
| 4,802,626 | 2/1989 | Forbes et al. | 428/905 X |
| 4,956,404 | 9/1990 | Pelzig | 524/48 |
| 5,037,343 | 8/1991 | Benites | 446/268 |
| 5,172,863 | 12/1992 | Melone et al. | 446/475 X |
| 5,355,551 | 10/1994 | Schechter et al. | 428/905 X |
| 5,569,511 | 10/1996 | Spector | 428/905 X |
| 5,676,583 | 10/1997 | Wang et al. | 446/268 |
| 5,800,746 | 9/1998 | Jones et al. | 264/211 X |

*Primary Examiner*—D. Neal Muir

[57] ABSTRACT

A system of colored, scented dolls is provided each constructed from a molded vinyl with a coloring substance and a scenting substance mixed therewith. The vinyl is molded in the form of a human, wherein the coloring substance and scenting substance are combined together in combinations selected from the group of combinations including red and cherry, green and lime, orange and orange, yellow and lemon, and purple and grape.

5 Claims, 2 Drawing Sheets

SCENTED DOLL ASSEMBLY

BACKGROUND OF THE INVENTION

1. Field of the Invention

The present invention relates to dolls and more particularly pertains to a new scented doll assembly for providing entertainment for children.

2. Description of the Prior Art

The use of dolls is known in the prior art. More specifically, dolls heretofore devised and utilized are known to consist basically of familiar, expected and obvious structural configurations, notwithstanding the myriad of designs encompassed by the crowded prior art which have been developed for the fulfillment of countless objectives and requirements.

Known prior art dolls and other play toys include U.S. Pat. No. 3,586,349; U.S. Pat. No. 2,079,550; U.S. Pat. No. Des. 354,533; U.S. Pat. No. Des. 245,930; U.S. Pat. No. Des. 353,418; and U.S. Pat. No. Des. 317,340.

In these respects, the scented doll assembly according to the present invention substantially departs from the conventional concepts and designs of the prior art, and in so doing provides an apparatus primarily developed for the purpose of providing entertainment for children.

SUMMARY OF THE INVENTION

In view of the foregoing disadvantages inherent in the known types of dolls now present in the prior art, the present invention provides a new scented doll assembly construction wherein the same can be utilized for providing entertainment for children.

The general purpose of the present invention, which will be described subsequently in greater detail, is to provide a new scented doll assembly apparatus and method which has many of the advantages of the dolls mentioned heretofore and many novel features that result in a new scented doll assembly which is not anticipated, rendered obvious, suggested, or even implied by any of the prior art dolls, either alone or in any combination thereof.

To attain this, the present invention generally comprises a plurality of dolls each constructed from a molded vinyl with a coloring substance and a scenting substance mixed therewith. The vinyl is molded in the form of a human figurine. The coloring substance and scenting substance are preferably combined together in one of a plurality of combinations selected from the group of combinations including red and cherry, green and lime, orange and orange, yellow and lemon, and purple and grape. The dolls each preferably have a body with movable arms and legs. As shown in FIG. 1, one of the arms includes a hand with a lollipop figurine mounted thereon. A neck of the body is equipped with an annular recess formed therein. Also included is a hollow head with an aperture formed on a bottom thereof for being pivotally engaged with the annular recess of the neck. Each of the dolls further includes hair mounted on the head. Clothes are removably mounted on the body. It is imperative that a color of the hair and the clothes matches that of the coloring substance mixed with the vinyl from which the corresponding doll is molded. Positioned on the clothing of each of the dolls is indicia which is representative of a unique name. This name is also representative of the scenting substance mixed with the vinyl from which the doll is molded.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new scented doll assembly apparatus and method which has many of the advantages of the dolls mentioned heretofore and many novel features that result in a new scented doll assembly which is not anticipated, rendered obvious, suggested, or even implied by any of the prior art dolls, either alone or in any combination thereof.

It is another object of the present invention to provide a new scented doll assembly which may be easily and efficiently manufactured and marketed.

It is a further object of the present invention to provide a new scented doll assembly which is of a durable and reliable construction.

An even further object of the present invention is to provide a new scented doll assembly which is susceptible of a low cost of manufacture with regard to both materials and labor, and which accordingly is then susceptible of low prices of sale to the consuming public, thereby making such scented doll assembly economically available to the buying public.

Still yet another object of the present invention is to provide a new scented doll assembly which provides in the apparatuses and methods of the prior art some of the advantages thereof, while simultaneously overcoming some of the disadvantages normally associated therewith.

Still another object of the present invention is to provide a new scented doll assembly for providing entertainment for children.

Even still another object of the present invention is to provide a new scented doll assembly that includes a plurality of colored, scented dolls each constructed from a molded vinyl with a coloring substance and a scenting substance mixed therewith. The vinyl is molded in the form of a human, wherein the coloring substance and scenting substance are combined together in combinations selected from the group of combinations including red and cherry, green and lime, orange and orange, yellow and lemon, and purple and grape.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
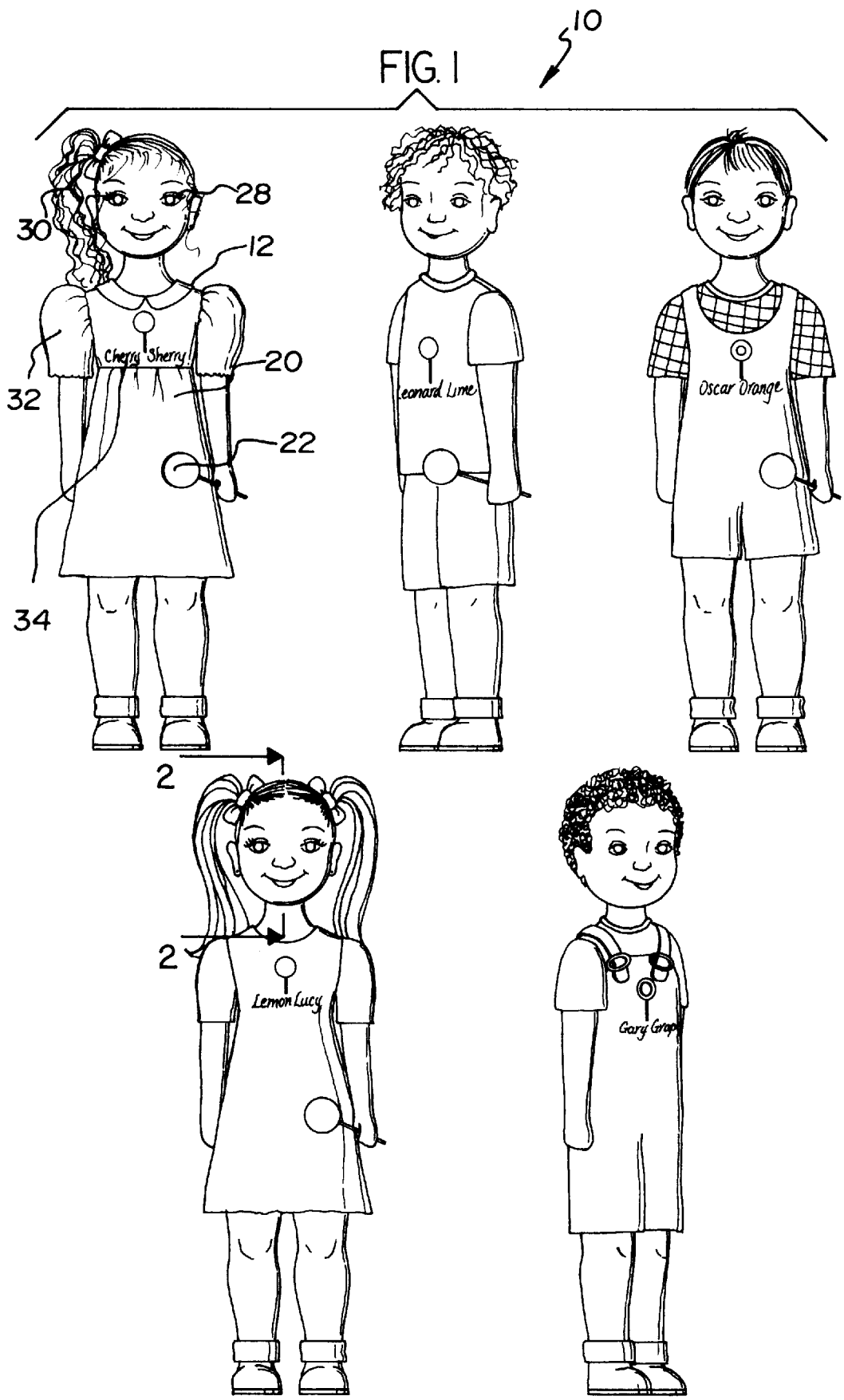
FIG. 1 is an exploded view of a new scented doll assembly according to the present invention.
Figure 2:
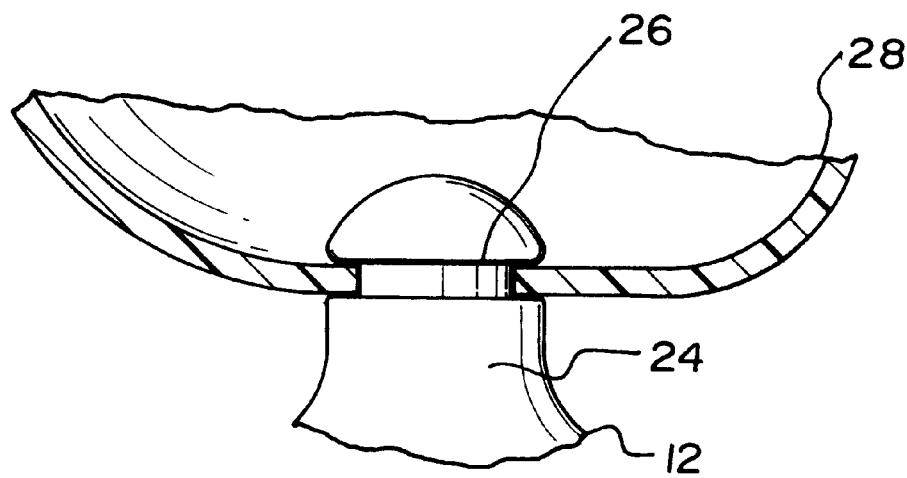
FIG. 2 is a side cross-sectional view of the head and neck of one of the dolls of the present invention.
Figure 3:
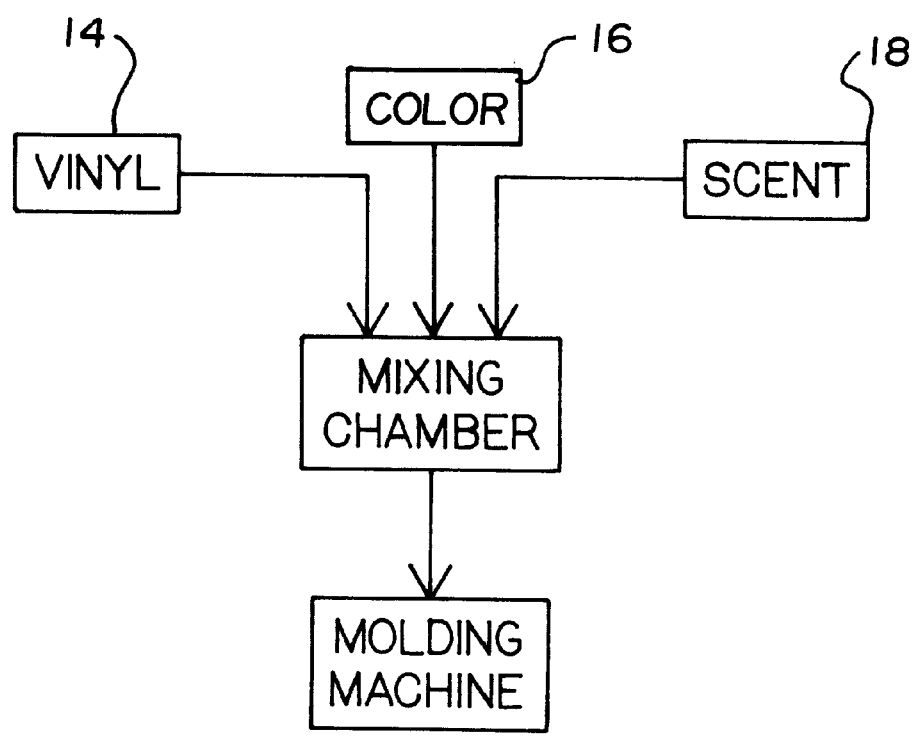
FIG. 3 is a flow chart depicting the process associated with the present invention.

With reference now to the drawings, and in particular to FIGS. 1 through 3 thereof, a new scented doll assembly embodying the principles and concepts of the present invention and generally designated by the reference numeral 10 will be described.

The present invention, designated as numeral 10, includes a plurality of dolls 12 each constructed from a molded vinyl 14 with a coloring substance 16 and a scenting substance 18 mixed therewith. The vinyl is molded in the form of a human figurine. The coloring substance and scenting substance are combined together in one of a plurality of combinations that correspond with each other. Such combinations are preferably selected from the group of combinations including red and cherry, green and lime, orange(color) and orange(scent), yellow and lemon, and purple and grape.

The dolls each preferably have a body 20 with movable arms and legs. As shown in FIG. 1, one of the arms includes a hand with a lollipop figurine 22 mounted thereon. A neck 24 of the body is equipped with an annular recess 26 formed therein. Also included is a hollow head 28 with an aperture formed on a bottom thereof for being pivotally engaged with the annular recess of the neck.

Each of the dolls further includes hair 30 mounted on the head. Clothes 32 are removably secured on the body. Each of the clothes preferably includes shorts or a skirt and a short sleeved shirt in order to expose the color of the arms and legs of the body. It is imperative that a color of the hair and the clothes matches that of the coloring substance mixed with the vinyl from which the corresponding doll is molded. While exactly the same coloring is preferably used, various shades of the coloring may vary per the desires of the user.

Positioned on the clothing of each of the dolls is indicia 34 which is representative of a unique name. This indicia is also representative of the scenting substance mixed with the vinyl from which the doll is molded. For example, the names are preferably selected from the group of name including: "Cherry Sherry", "Leonard Lime", "Oscar Orange", "Lemon Lucy", and "Gary Grape".

The process of constructing the colored, scented dolls will now be set forth, as shown in FIG. 3. After providing the vinyl material, scenting substances, and coloring substances as set forth hereinabove, further provided is a mixing chamber and a mold in the shape of a doll. Thereafter, the vinyl, one of the coloring substances, and one of the scenting substances are mixed in the mixing chamber in one of the aforementioned unique combinations. Next, the mixed vinyl, coloring substance, and scenting substance are placed into the mold to cool and take the form of a doll.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system of colored, scented dolls comprising, in combination:

a plurality of dolls each constructed from a molded vinyl with a coloring substance and a scenting substance mixed therewith, wherein the vinyl is molded in the form of a human, wherein the coloring substance and scenting substance are combined together in combinations selected from the group of combinations including red and cherry, green and lime, orange and orange, yellow and lemon, and purple and grape;

said dolls each having a body with movable arms and legs wherein one of the arms includes a hand with a lollipop figurine mounted thereon, a neck with an annular recess formed therein, a hollow head with an aperture formed on a bottom thereof for being pivotally engaged with the annular recess of the neck;

said dolls each further including hair mounted on the head and clothes removably mounted on the body, wherein a color of the hair and the clothes matches that of the coloring substance mixed with the vinyl from which the corresponding doll is molded;

said dolls each having indicia positioned on the clothing thereof which is representative of a unique name and further representative of the scenting substance mixed with the vinyl from which the doll is molded.

2. A system of colored, scented dolls comprising:

a plurality of dolls each constructed from a molded vinyl with a coloring substance and a scenting substance mixed therewith, wherein the vinyl is molded in the form of a human and the coloring substance and scenting substance are combined together in combinations selected from the group of combinations including red and cherry, green and lime, orange and orange, yellow and lemon, and purple and grape.

3. A system of colored, scented dolls as set forth in claim 2 wherein said dolls each have a body with movable arms and legs wherein one of the arms includes a hand with a lollipop figurine mounted thereon, a neck with an annular recess formed therein, a hollow head with an aperture formed on a bottom thereof for being pivotally engaged with the annular recess of the neck.

4. A system of colored, scented dolls as set forth in claim 2 wherein said dolls each further include hair mounted on a head thereof and clothes removably secured on a body thereof, wherein a color of the hair and the clothes matches that of the coloring substance mixed with the vinyl from which the corresponding doll is molded.

5. A system of colored, scented dolls as set forth in claim 2 wherein said dolls each have indicia positioned on clothing thereof which is representative of a unique name and further representative of the scenting substance mixed with the vinyl from which the doll is molded.

* * * * *